(12) United States Patent
Yong et al.

(10) Patent No.: US 11,603,135 B2
(45) Date of Patent: Mar. 14, 2023

(54) VEHICLE BODY

(71) Applicants: Hyundai Motor Company, Seoul (KR); Kia Corporation, Seoul (KR)

(72) Inventors: Ji Ae Yong, Hwaseong-si (KR); Seok Ju Gim, Seongnam-si (KR); Ho Yeon Kim, Daegu (KR); Chui Hee Heo, Hwaseong-si (KR); Tae Gyu Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/344,587

(22) Filed: Jun. 10, 2021

(65) Prior Publication Data

US 2022/0185377 A1 Jun. 16, 2022

(30) Foreign Application Priority Data

Dec. 10, 2020 (KR) ........................ 10-2020-0172445

(51) Int. Cl.
*B60J 7/00* (2006.01)
*B62D 21/15* (2006.01)
*B62D 27/02* (2006.01)
*B62D 25/20* (2006.01)

(52) U.S. Cl.
CPC ............. *B62D 21/15* (2013.01); *B62D 25/20* (2013.01); *B62D 27/02* (2013.01)

(58) Field of Classification Search
CPC ........ B60G 2204/128; B60G 2202/312; B60G 15/068; B60G 2204/418; B60G 2500/10; B60G 2202/24; Y02T 10/12; B62D 25/088; F16F 9/54
See application file for complete search history.

(56) References Cited

U.S. PATENT DOCUMENTS

| | | | |
|---|---|---|---|
| 4,108,469 A * | 8/1978 | Schwarzbich | F16C 19/10 267/34 |
| 4,986,597 A | 1/1991 | Clausen | |
| 5,209,541 A | 5/1993 | Janotik | |
| 5,549,352 A | 8/1996 | Janotik et al. | |
| 5,692,798 A * | 12/1997 | Wehner | B62D 21/11 296/203.02 |
| 6,073,992 A | 6/2000 | Yamauchi et al. | |
| 6,282,790 B1 | 9/2001 | Jaekel et al. | |
| 6,334,642 B1 | 1/2002 | Waldeck et al. | |

(Continued)

FOREIGN PATENT DOCUMENTS

| | | |
|---|---|---|
| CN | 19980070976 A | 10/1998 |
| CN | 107054039 A | 8/2017 |
| WO | 2005066012 A1 | 7/2005 |

*Primary Examiner* — Kiran B Patel
(74) *Attorney, Agent, or Firm* — Slater Matsil, LLP

(57) ABSTRACT

A vehicle body includes a plurality of shock absorber housings positioned at right and left sides of the vehicle body and configured to cover and support shock absorbers of a vehicle, wherein a lower end of each of the shock absorber housings includes a flange unit comprising a plurality of flanges arranged along an outer periphery of the lower end of the shock absorber housing, and a connection member connecting the shock absorber housings to each other in a width direction of the vehicle body, wherein an end of the connection member is fitted between the flanges of the flange unit and is coupled to a corresponding one of the shock absorber housings.

20 Claims, 2 Drawing Sheets

(56) References Cited

U.S. PATENT DOCUMENTS

| | | |
|---|---|---|
| 6,824,204 B2 | 11/2004 | Gabbianelli et al. |
| 6,948,768 B2 | 9/2005 | Corcoran et al. |
| 7,677,646 B2 | 3/2010 | Nakamura |
| 8,998,216 B2 | 4/2015 | Maeda et al. |
| 10,800,224 B2 | 10/2020 | Sellars et al. |
| 2017/0225714 A1 | 8/2017 | Ito |
| 2019/0299737 A1 | 10/2019 | Sellars et al. |
| 2020/0307701 A1* | 10/2020 | Park .................. B62D 25/081 |
| 2020/0324821 A1* | 10/2020 | Heo .................... B62D 25/02 |

* cited by examiner

VEHICLE BODY

CROSS-REFERENCE TO RELATED APPLICATIONS

This application claims the benefit of Korean Patent Application No. 10-2020-0172445, filed on Dec. 10, 2020, which application is hereby incorporated herein by reference.

TECHNICAL FIELD

The present invention relates to a vehicle body.

BACKGROUND

In general, a vehicle body must be designed to allow various components in the vehicle to be mounted thereon and, when a collision impact is applied to the vehicle, to efficiently absorb the collision impact and thus to protect passengers in the vehicle from the collision impact.

A conventional vehicle requires a space in which an engine or a battery is mounted and a space in which wheels, a suspension device, a steering device and the like for driving the vehicle are mounted. Accordingly, because wheel housings for accommodating the wheels, the suspension device provided at the wheels, the steering device connecting the wheels to each other, the drive device for supplying driving force and the like occupy a considerable amount of space, the vehicle body must be designed to provide sufficient space to accommodate the components and to absorb impacts applied to the vehicle. Furthermore, as the number of associated components increases, the process of manufacturing and assembling the vehicle is increasingly complicated, and the time required to perform the process is increased.

In recent years, an in-wheel system, in which a drive unit, a steering unit, a reduction gear and the like are mounted, has been developed. In the in-wheel system, because there is no need to connect the individual wheels to each other, the vehicle body must also be designed differently from a conventional vehicle. Accordingly, when a vehicle adopts the in-wheel system, there is a need to develop a vehicle body capable of providing space for wheel housings, ensuring sufficient rigidity of the vehicle body and simplifying a process of manufacturing and assembling the vehicle body.

The details described as the background art are intended merely for the purpose of promoting understanding of the background of the present invention, and should not be construed as an acknowledgment of the prior art that is previously known to those of ordinary skill in the art.

SUMMARY

The present invention relates to a vehicle body. Particular embodiments relate to a vehicle body of an in-wheel platform vehicle, which includes a plurality of shock absorber housings positioned above respective wheels, and a connection member connecting the shock absorber housings, positioned at right and left sides of the vehicle, to each other in a width direction of the vehicle.

Therefore, embodiments of the present invention can solve problems in the art, and an embodiment of the present invention provides a vehicle body of an in-wheel platform vehicle, which includes a plurality of shock absorber housings positioned above respective wheels, and a connection member connecting the shock absorber housings, positioned at right and left sides of the vehicle, to each other in the width direction of the vehicle in the state in which the connection member is fitted into flange units at the lower ends of the shock absorber housings, thereby ensuring sufficient collision rigidity and assembly rigidity.

An embodiment of the present invention provides a vehicle body including a plurality of shock absorber housings configured to cover and support shock absorbers of a vehicle, and a connection member connecting the shock absorber housings, positioned at right and left sides of the vehicle, to each other in a width direction of the vehicle, wherein a lower end of each of the shock absorber housings is provided along an outer periphery thereof with a flange unit composed of a plurality of flanges, and an end of the connection member is fitted between the flanges of the flange unit and is coupled to a corresponding one of the shock absorber housings.

Each of the shock absorber housings may be coupled to the connection member via an upper surface, a lower surface or a side surface of a space defined between the flanges of the flange unit in the state in which the connection member is fitted into the space between the flanges of the flange unit.

The connection member may be configured to extend longitudinally and to have a closed surface at an end thereof, and the closed surface, an upper surface, a lower surface or a side surface of the connection member may be coupled to the flange unit in a surface-contact state.

The connection member may be configured to extend, to have an internal space therein, and to be open at one surface thereof, and may be coupled to the flange unit using a tool introduced thereinto through the open surface.

The connection member may include at least one connection member, and the at least one member may be fitted at an end thereof between the flanges of the flange unit at a front or rear portion of the shock absorber, and may be coupled to the shock absorber housing.

Each of the shock absorber housings may be provided at a lateral portion thereof with a reinforcing member, and the reinforcing member may be fitted between the flanges of the flange unit at the lateral portion of the shock absorber housing, and may be coupled to the shock absorber housing or the at least one connection cover.

The reinforcing member may be configured to extend longitudinally and to have a closed surface at one end thereof, and the closed surface, an upper surface, a lower surface or a side surface of the reinforcing member may be coupled to a side surface of the flange unit or the connection member in a surface-contact state.

The reinforcing member may be configured to extend with an internal space therein and to be open at one surface thereof, and may be coupled to a side surface of the flange unit or the connection member using a tool introduced thereinto through the open surface.

The plurality of shock absorber housings may be provided thereunder with a grid-shaped floor member, and each of the plurality of shock absorber housings may be supported by the floor member via a plurality of support members.

Each of the support members may support a lower end of a corresponding one of the plurality of shock absorber housings, and may be coupled at an upper end thereof both to the flange unit of the shock absorber housing and to the connection member.

Each of the plurality of shock absorber housings may be provided at the lower end thereof with a front or rear lower truss member, which extends downward and is then bent so as to connect front or rear shock absorber housings to each other in the width direction of the vehicle, and an end of each of the front or rear lower truss members may be coupled both to the flange unit of the shock absorber housing and to the connection member.

Each of the plurality of shock absorber housings may be provided at the lower end thereof with a lateral lower truss member, which extends downward and is then bent so as to connect lateral shock absorber housings to each other in a longitudinal direction of the vehicle, and an end of each of the lateral truss members may be coupled both to the flange unit of the shock absorber housing and to the reinforcing member.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
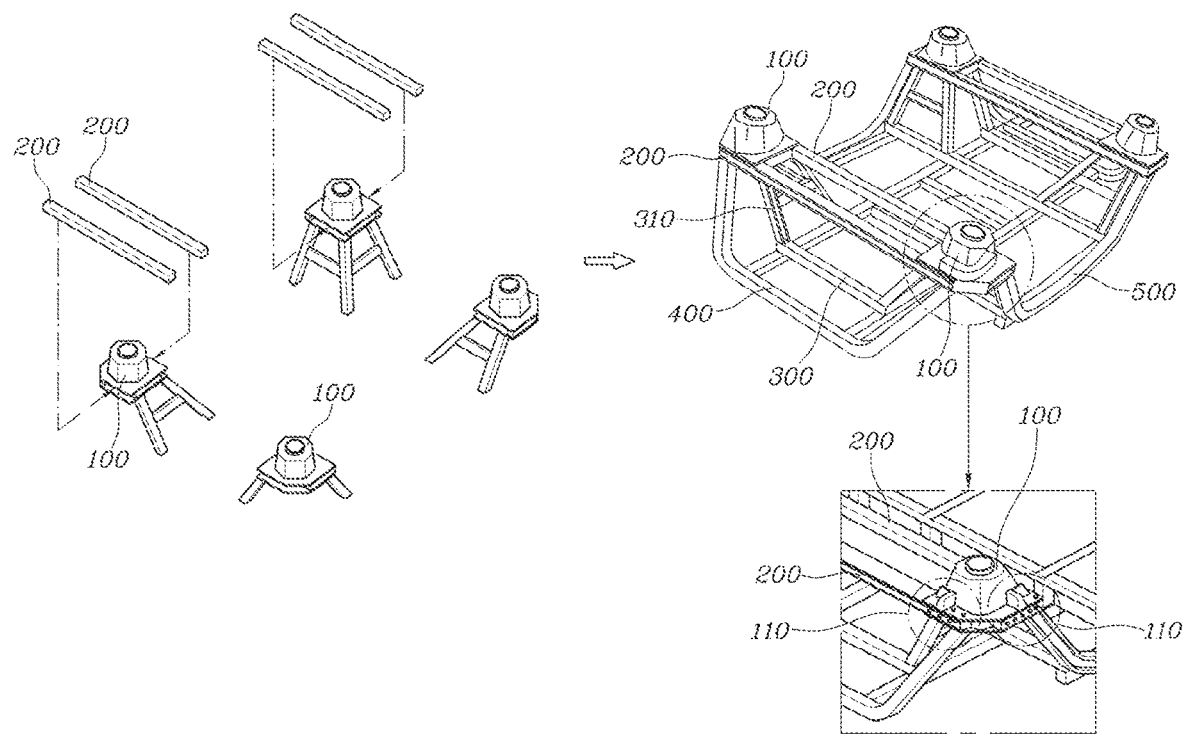
FIG. 1 is a view illustrating the vehicle body according to an embodiment of the present invention in which connection members are coupled to shock absorber housings.
Figure 2:
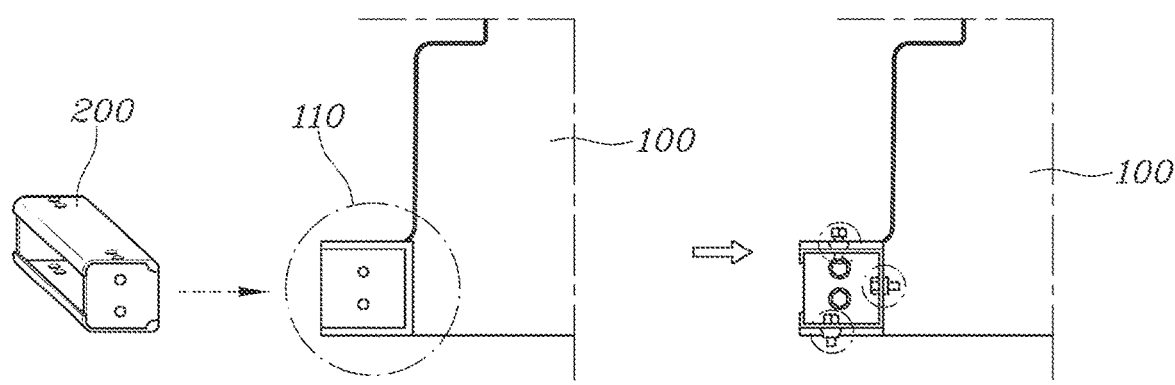
FIG. 2 is a side elevation view illustrating the vehicle body according to an embodiment of the present invention in which the connection member is coupled to the shock absorber housing.
Figure 3:
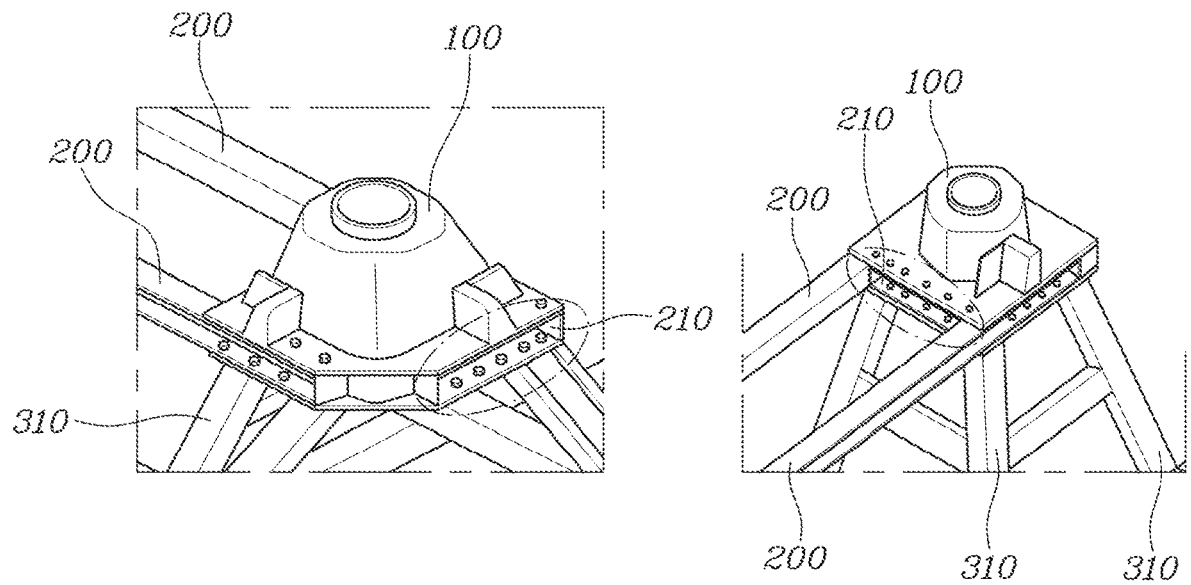
FIG. 3 is a view illustrating the vehicle body according to an embodiment of the present invention in which a reinforcing member is coupled to the shock absorber housing or to at least one connection member.
Figure 4:
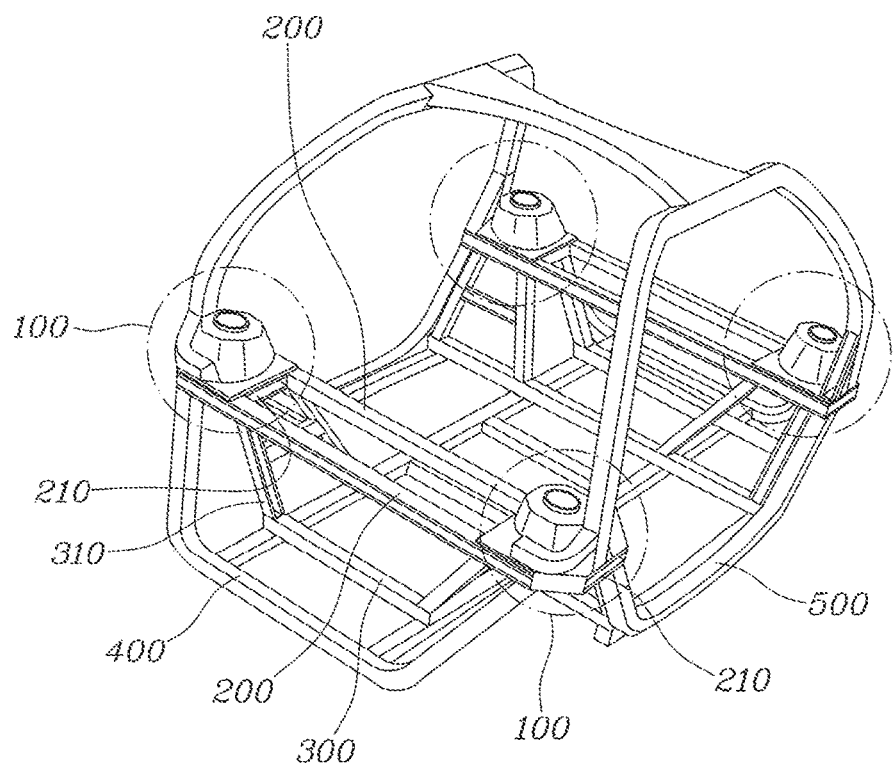
FIG. 4 is a view illustrating the vehicle body according to an embodiment of the present invention.

FIG. 1 is a view illustrating the vehicle body according to an embodiment of the present invention in which connection members are coupled to shock absorber housings. FIG. 2 is a side elevation view illustrating the vehicle body according to an embodiment of the present invention in which a connection member is coupled to a shock absorber housing. FIG. 3 is a view illustrating the vehicle body according to an embodiment of the present invention in which a reinforcing member is coupled to a shock absorber housing or to at least one connection member. FIG. 4 is a view illustrating the vehicle body according to an embodiment of the present invention.

FIG. 1 is a view illustrating the vehicle body according to an embodiment of the present invention in which the connection members are coupled to the shock absorber housings. The vehicle body according to an embodiment of the present invention includes a plurality of shock absorber housings 100 adapted to cover and support shock absorbers, and connection members 200 connecting the shock absorber housings 100, which are disposed at the right and left sides of the vehicle, to each other in the width direction of the vehicle. The lower end of each shock absorber housing 100 is provided with a flange unit 110 composed of a plurality of flanges, which are provided along the outer periphery of the lower end of the shock absorber housing 100 and are vertically spaced apart from each other. Each of the connection members 200 is coupled to the shock absorber housing 100 in the state in which the end of the connection member 200 is fitted between the flanges of the flange unit 110.

The shock absorber housing 100 may be coupled to the connection member 200 through the upper surface, the lower surface or the side surface of the space in the state in which the connection member 200 is fitted into the space between the flanges of the flange unit 110.

Unlike conventional vehicles, the vehicle body according to an embodiment of the present invention is intended to be applied to a vehicle adopting an in-wheel system, and does not require a drive shaft or a steering device to be connected to the wheels. Accordingly, each of the wheels of the vehicle is provided with the shock absorber and the shock absorber housing 100, which are disposed above the wheel. The shock absorber housing 100 is configured to project with the internal space therein such that the shock absorber is positioned in the internal space in the projection 120. Since the shock absorber is disposed in the internal space and is coupled to the inner wall of the housing 100 and supported thereby, the shock absorber housing 100 protects the wheel of the vehicle and the shock absorber disposed above the wheel. The connection members 200 are coupled to the shock absorber housings 100 positioned at the right and left sides of the vehicle so as to connect the plurality of shock absorber housings 100 to each other in the width direction of the vehicle and to increase the collision rigidity of the vehicle in the event of a lateral collision.

Specifically, the lower end of the shock absorber housing 100 is provided with the flange unit 110 composed of a plurality of flanges, which are vertically spaced apart from each other so as to define a space having a 'U'-shaped cross-section therebetween. The connection member 200 is coupled in the space through an open surface of the flange unit. The connection member 200 is also configured to have an open cross-section so as to correspond to the space, and is fitted into the space and is coupled to the flange unit 110 of the shock absorber housing 100.

FIG. 2 is a side elevation view illustrating the vehicle body according to an embodiment of the present invention in which the connection member is coupled to the shock absorber housing. The connection member 200 of the vehicle body according to an embodiment of the present invention is configured to extend longitudinally, and has a closed surface at the end thereof. The closed surface, the upper surface, the lower surface or the side surface of the connection member 200 may be coupled to the flange unit 110 in the surface-contact state. The connection member 200 may be configured to extend with an internal space therein and to be open at one surface thereof, whereby the connection member 200 is coupled to the flange unit 110 using a tool introduced into the internal space through the open surface.

Specifically, because the connection member 200 is fitted into the flange unit 110 so as to be assembled therewith and is open at one surface thereof so as to have an open cross-section, the connection member 200 is in surface contact with the inner surface of the space of the flange unit 110 when the connection member 200 is coupled to the flange unit 110. The connection member 200 is fitted into the space in the flange unit 110, and is coupled to the inner surface of the space through bolting using a tool introduced thereinto through the open surface of the connection member 200. This coupling method makes it possible to maintain the rigidity of the vehicle itself and the coupling rigidity between the members when the shock absorber housing 100 is coupled to the connection member 200 and enables a human or a robot to conveniently and easy assemble the members.

FIG. 3 is a view illustrating the vehicle body according to an embodiment of the present invention in which a reinforcing member is coupled to the shock absorber housing or to at least one connection member. In the vehicle body according to an embodiment of the present invention, the connection member 200 may include at least one connection member. The at least one connection member 200 may be fitted at the end thereof between the flanges of the flange unit 110 from the front or rear side of the shock absorber housing 100, and may then be coupled to the shock absorber housing 100. The at least one connection member 200 may be coupled to a portion of the shock absorber housing 100 that requires reinforcement of rigidity, or to the front or rear portion of the shock absorber housing 100 so as to increase the lateral collision rigidity of the vehicle body. Furthermore, the at least one connection member 200 may also be connected to at least one location between the shock absorber housings 100 so as to increase the assembly rigidity.

In the vehicle body according to an embodiment of the present invention, the lateral portion of the shock absorber housing 100 may be provided at a lateral portion thereof with a reinforcing member 210. The reinforcing member 210 may be fitted between the flanges of the flange unit 110 at the lateral portion of the shock absorber housing 100, and may then be coupled to the shock absorber housing 100 or to the at least one connection member 200.

Specifically, the flange unit 110 is formed along the outer periphery of the lower end of the shock absorber housing 100, and the connection member 200 is fitted into and coupled to the flange unit 110 from the front or rear side of the shock absorber housing 100. Here, the flange unit 110 at the lateral portion of the lower end of the shock absorber housing 100 that is not provided with the connection member 200 is maintained in the state in which the space between the flanges of the flange unit 110 is empty. Since the reinforcing member 210 is fitted into the space between the flanges at the lateral portion of the shock absorber housing 100 and is coupled thereto, it is possible to increase the assembly rigidity between the shock absorber housings 100 or the connection members 200.

In the vehicle body according to an embodiment of the present invention, the reinforcing member 210 may be configured to extend in the longitudinal direction and to have a closed surface at the end thereof. The closed surface, the upper surface, the lower surface or the side surface of the reinforcing member 210 may be coupled to a side surface of the flange unit 110 or the connection member 200 in a surface-contact state. The reinforcing member 210 may be configured to extend with the internal space therein and to have an open surface such that the reinforcing member 210 is coupled to the side surface of the flange unit 110 or to the connection member 200 using a tool introduced thereinto through the open surface.

In other words, the reinforcing member 210 is fitted in the space between the flanges at the lateral portion of the lower end of the shock absorber housing 100, to which the connection member 200 is not coupled, and is coupled thereto in the state of being in surface contact with the shock absorber housing 100 or the connection member 200. Furthermore, when the connection member 200 is coupled to the front or rear portion of the lower end of the shock absorber housing 100, the closed surface of the end of the reinforcing member 210 is coupled to a side wall of the front or rear connection member 200 in the surface-contact state. As a result, it is possible to further increase collision rigidity or assembly rigidity between the shock absorber housings 100 and between the front and rear connection members 200.

In the vehicle body according to an embodiment of the present invention, the plurality of shock absorber housings 100 may be provided thereunder with a grid-shaped floor member 300, and may be supported by the floor member 300 by means of respective support members 310. Each of the support members 310 may support the end of a corresponding shock absorber housing 100, and may be coupled at the upper end thereof both to the flange unit 110 of the shock absorber housing 100 and to the connection member 200.

Specifically, each of the support members 310 is coupled at the two ends thereof both to the floor member 300 and to the shock absorber housing 100 so as to connect the floor member 300 to the shock absorber housing 100. Here, since the upper end of the support member 310 is coupled both to the flange unit 110 of the shock absorber housing 100 and to the connection member 200 rather than being simply coupled only to the lower end of the shock absorber housing 100, the load of the vehicle is distributed to the floor member 300 and to the plurality of shock absorber housings 100 positioned above the floor member 300, thereby further increasing the collision rigidity and the assembly rigidity of the vehicle body.

FIG. 4 is a view illustrating the vehicle body according to an embodiment of the present invention. In the vehicle body according to an embodiment of the present invention, the shock absorber housing 100 may be provided at the lower end thereof with a front or rear lower truss member 400, which extends downwards and is then bent so as to connect front or rear shock absorber housings 100 to each other in the width direction of the vehicle. The ends of the front or rear lower truss member 400 may be coupled both to the flange unit 110 of the shock absorber housing 100 and to the connection member 200.

Specifically, the front or rear lower truss member 400 is coupled to the lower ends of the shock absorber housing 100 so as to increase the collision rigidity in the event of a front or rear collision and a lateral collision and to distribute the load of the vehicle to the various members of the vehicle body. Here, since the front or rear lower truss member 400 is also coupled both to the flange units 110 of the shock absorber housings 100 and to the connection member 200, rather than being simply coupled only to the lower ends of the shock absorber housings 100, the various members of the vehicle body are more securely coupled to each other. Hence, since the ability of the vehicle body to endure impacts is increased, it is possible to appropriately distribute even a high load to the various members of the vehicle body.

In the vehicle body according to an embodiment of the present invention, the shock absorber housing 100 may be provided thereunder with a lateral lower truss member 500, which extends downwards and is then bent so as to connect shock absorber housings, positioned at a lateral side of the vehicle, to each other in the longitudinal direction of the vehicle. The ends of the lateral lower truss member 500 may be coupled both to the flange units 110 of the shock absorber housings 100 and to the reinforcing members 210.

Specifically, the lateral lower truss member 500 is coupled to the lower ends of the shock absorber housings 100 so as to increase collision rigidity in the event of a lateral or front or rear collision and to distribute the load to the various members of the vehicle body. Here, since the lateral lower truss member 500 is also coupled both to the flange units 110 of the shock absorber housings 100 and to the connection member 200, rather than being simply coupled only to the lower ends of the shock absorber housings 100, the various members of the vehicle body are more securely coupled to each other. Hence, since the ability of the vehicle body to endure impacts is increased, it is possible to appropriately distribute even a high load to the various members of the vehicle body.

The vehicle body according to an embodiment of the present invention ensures sufficient rigidity of the vehicle body and sufficient assembly rigidity, and enables the various members of the vehicle body to be conveniently assembled using bolting or the like through the open surfaces. Furthermore, even when the overall width of the vehicle is changed, shock absorber housings 100 are easily connected to each other in the lateral direction by adjusting the length of the connection member 200 according to the magnitude of change in the overall width, making it possible to easily apply the vehicle body to various types of vehicles.

As is apparent from the above description, embodiments of the present invention provide a vehicle body of an in-wheel platform vehicle, which includes a plurality of shock absorber housings positioned above respective wheels, and a connection member connecting the shock absorber housings, positioned at right and left sides of the vehicle, to each other in a width direction of the vehicle in the state in which the connection member is fitted into flange units at the lower ends of the shock absorber housings, thereby ensuring sufficient collision rigidity and assembly rigidity.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle body comprising:
a plurality of shock absorber housings positioned at right and left sides of the vehicle body and configured to cover and support shock absorbers of a vehicle, wherein a lower end of each of the shock absorber housings includes a flange unit comprising a plurality of flanges arranged along an outer periphery of the lower end of the shock absorber housing; and
a connection member connecting the shock absorber housings to each other in a width direction of the vehicle body, wherein an end of the connection member is fitted between the flanges of the flange unit and is coupled to a corresponding one of the shock absorber housings.

2. The vehicle body according to claim 1, wherein each of the shock absorber housings is coupled to the connection member via an upper surface, a lower surface or a side surface of a space defined between the flanges of the flange unit in a state in which the connection member is fitted into the space between the flanges of the flange unit.

3. The vehicle body according to claim 1, wherein the connection member extends longitudinally and has a closed surface at an end thereof, and the closed surface, an upper surface, a lower surface or a side surface of the connection member is coupled to the flange unit in a surface-contact state.

4. The vehicle body according to claim 3, wherein the connection member extends with an internal space therein, is open at one surface thereof, and is coupled to the flange unit using a tool introduced through the open surface.

5. The vehicle body according to claim 1, wherein the connection member includes at least one member, and the at least one member is fitted at an end thereof between the flanges of the flange unit at a front or rear portion of the shock absorber and is coupled to the shock absorber housing.

6. The vehicle body according to claim 5, further comprising reinforcing members provided at a lateral portion of each of the shock absorber housings, wherein each of the reinforcing members is fitted between the flanges of the flange unit at the lateral portion of the shock absorber housing and is coupled to the shock absorber housing or to the at least one member.

7. The vehicle body according to claim 6, wherein each of the reinforcing members extends longitudinally and has a closed surface at one end thereof, and the closed surface, an upper surface, a lower surface or a side surface of the reinforcing member is coupled to a side surface of the flange unit or to the connection member in a surface-contact state.

8. The vehicle body according to claim 7, wherein each of the reinforcing members extends with an internal space therein, is open at one surface thereof, and is coupled to a side surface of the flange unit or the connection member using a tool introduced thereinto through the open surface.

9. The vehicle body according to claim 6, further comprising lateral lower truss members provided at a lower end of each of the plurality of shock absorber housings, wherein the lateral lower truss members extend downward and are then bent so as to connect lateral shock absorber housings to each other in a longitudinal direction of the vehicle body, and wherein an end of each of the lateral lower truss members is coupled both to the flange unit of the shock absorber housing and to the reinforcing member.

10. The vehicle body according to claim 1, further comprising a grid-shaped floor member under the plurality of shock absorber housings, wherein each of the plurality of shock absorber housings is configured to be supported by the floor member via a plurality of support members.

11. The vehicle body according to claim 10, wherein each of the support members is configured to support a lower end of a corresponding one of the plurality of shock absorber housings, and is coupled at an upper end thereof both to the flange unit of the shock absorber housing and to the connection member.

12. The vehicle body according to claim 1, further comprising front or rear lower truss members at a lower end of each of the plurality of shock absorber housings, each of the front or rear lower truss members extending downward and then bent so as to connect the shock absorber housings to each other in the width direction of the vehicle, wherein an end of each of the front or rear lower truss members is coupled both to the flange unit of the shock absorber housing and to the connection member.

13. A vehicle comprising:
a vehicle body including a grid-shaped floor member;
shock absorbers;
shock absorber housings above the grid-shaped floor member and at right and left sides of the vehicle, the shock absorber housings being configured to cover and support the shock absorbers;
flange units at a lower end of each of the shock absorber housings, each of the flange units comprising a plurality of flanges arranged along an outer periphery of the lower end of the shock absorber housing; and
a connection member connecting the shock absorber housings to each other in a width direction of the vehicle, wherein an end of the connection member is fitted between the flanges of the flange unit and is coupled to a corresponding one of the shock absorber housings.

14. The vehicle according to claim 13, wherein each of the shock absorber housings is coupled to the connection member via an upper surface, a lower surface or a side surface of a space defined between the flanges of the flange unit in a state in which the connection member is fitted into the space between the flanges of the flange unit.

15. The vehicle according to claim 13, wherein the connection member extends longitudinally and has a closed surface at an end thereof, and the closed surface, an upper surface, a lower surface or a side surface of the connection member is coupled to the flange unit in a surface-contact state.

16. The vehicle body according to claim 15, wherein the connection member extends with an internal space therein, is open at one surface thereof, and is coupled to the flange unit using a tool introduced through the open surface.

17. The vehicle according to claim 13, wherein the connection member includes at least one member, and the at least one member is fitted at an end thereof between the flanges of the flange unit at a front or rear portion of the shock absorber and is coupled to the shock absorber housing.

18. The vehicle according to claim 17, further comprising reinforcing members provided at a lateral portion of each of the shock absorber housings, wherein:
  each of the reinforcing members is fitted between the flanges of the flange unit at the lateral portion of the shock absorber housing and is coupled to the shock absorber housing or to the at least one member;
  each of the reinforcing members extends longitudinally and has a closed surface at one end thereof, and the closed surface, an upper surface, a lower surface or a side surface of the reinforcing member is coupled to a side surface of the flange unit or to the connection member in a surface-contact state; and
  each of the reinforcing members extends with an internal space therein, is open at one surface thereof, and is coupled to a side surface of the flange unit or the connection member using a tool introduced thereinto through the open surface.

19. The vehicle according to claim 18, further comprising lateral lower truss members provided at a lower end of each of the shock absorber housings, wherein the lateral lower truss members extend downward and are then bent so as to connect lateral shock absorber housings to each other in a longitudinal direction of the vehicle body, and wherein an end of each of the lateral truss members is coupled both to the flange unit of the shock absorber housing and to the reinforcing member.

20. The vehicle according to claim 13, wherein each of the shock absorber housings is configured to be supported by the floor member via a plurality of support members, and wherein each of the support members is configured to support a lower end of a corresponding one of the shock absorber housings, and is coupled at an upper end thereof both to the flange unit of the shock absorber housing and to the connection member.

* * * * *